United States Patent
Aho

(10) Patent No.: US 7,325,098 B1
(45) Date of Patent: Jan. 29, 2008

(54) SYSTEM AND METHOD FOR NON-DESTRUCTIVE HANDLING OF OUTSIZED WORDS BY A CACHE

(75) Inventor: Eric David Aho, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 320 days.

(21) Appl. No.: 10/934,022

(22) Filed: Sep. 3, 2004

(51) Int. Cl.
*G06F 12/00* (2006.01)
*G06F 13/28* (2006.01)
*G06F 13/00* (2006.01)

(52) U.S. Cl. ..................... 711/130; 711/118

(58) Field of Classification Search ............... 711/118, 711/130
See application file for complete search history.

(56) References Cited

U.S. PATENT DOCUMENTS

| | | | | |
|---|---|---|---|---|
| 5,414,857 A | * | 5/1995 | Jeddeloh et al. | 710/241 |
| 5,579,504 A | * | 11/1996 | Callander et al. | 711/144 |
| 5,721,957 A | * | 2/1998 | Huang et al. | 710/66 |
| 6,360,194 B1 | * | 3/2002 | Egolf | 703/26 |
| 6,760,811 B2 | * | 7/2004 | Buzby et al. | 711/130 |
| 2002/0082822 A1 | * | 6/2002 | Noyes | 703/27 |

* cited by examiner

*Primary Examiner*—Donald Sparks
*Assistant Examiner*—Prasith Thammavong
(74) *Attorney, Agent, or Firm*—Richard J. Gregson; Werner & Axenfeld, P.C.

(57) ABSTRACT

An extended data queue is added to the cache circuitry of a processor to handle extended data when the processor operates on a different architecture than the system it resides on. The extended data for each word coming into the processor is stored in the queue. If the extended data has some valid information, the word is replaced to ensure the information is not lost. If there is no valid information in the extended data, then the bits of the extended data are simply set to zero.

14 Claims, 4 Drawing Sheets

SYSTEM AND METHOD FOR NON-DESTRUCTIVE HANDLING OF OUTSIZED WORDS BY A CACHE

FIELD OF THE INVENTION

The present invention is applicable to computer systems and other electronic data processing environments where there are different architectures, or at least different word lengths called upon to work in the same system, and particularly applicable to systems having memory subsystems such as cache memories which will be called upon to handle two different word sizes.

BACKGROUND OF THE INVENTION

Computer systems operate primarily by using microprocessors, also known as integrated circuits (IC), which typically include a central processing unit (CPU) and internal memory. The ICs analyze data to obtain a desired output. The data analysis is governed and determined by certain commands and directives from programs, or software, residing on the computer's memory, which may be stored on hard disks or memory chips, known as random access memory (RAM).

Processors function on a clock cycle, one operation is performed per unit of time, for example, one per millisecond. Every function is executed with a specific size of data, called a word, determined by the size of the chip's data path, or bus, and its physical design, or architecture. For example, a 56-bit chip has 56-bit wide data path. Data is transferred 56-bits at a time, and therefore, a word on a data path on the chip is 56-bits wide. This is referred to as a 56-bit architecture. Other chips can have processors of other sizes. In heterogeneous computer systems there may be processors of more than one word size, which can be problematic in many areas, including especially areas where there may be both sized words used for the same thing or on the same data paths.

Although many of the problems in such heterogeneous systems have been worked around, when a plurality of word sizes are used in the same memory systems, many problems can result. One of the key areas is in cache memory where each of the types of heterogeneously architected processors have access to the same permanent data stores or to the same main memory system. When a "wrong sized word" shows up in the cache of a processor, something must be done.

Many of the tasks performed by the processor are done repeatedly using the same instructions and/or the same data over and over. Accessing this same data and instructions repeatedly at a main memory or worse at permanent data stores is a waste of time and energy. To avoid such pitfalls, specialized memory subsystems such as cache memory were designed, and these are important to the efficient operation of nearly all processors today.

Cache is a special high-speed storage mechanism. A memory cache, sometimes called a cache store or RAM cache, is a portion of memory made of high-speed static RAM (SRAM) instead of the slower and cheaper dynamic RAM (DRAM) used for main memory. Data and instructions repeatedly accessed are stored in the faster SRAM to avoid accessing the slower DRAM, or the even slower hard disk.

Memory caches are also built into the microprocessor architecture between the CPU and DRAM. There may be more than one type of cache on a processor chip, each distinguished by its position relative to the processor. For example, a level 1 (L1) cache is closer to the processor than a level 2 (L2) cache.

As an example of the benefits provided by a memory cache, consider a 512 KB level 2 cache, caching 64 MB of system memory. In general, such a configuration may supply information that the processor requests 90-95% of the time, depending on the application and other factors. That is less than 1% (512 KB L2 cache) of the cached memory (the 64 MB of system memory) used to provide at least 90% of processor requests.

Thus, it is clear that caching will be used in such systems and that there is a need to handle calls by the heterogeneous processors to a memory system (main or long term storage, particularly) when such memory systems handle more than one word type with more than one word length so that the processors will not corrupt data in areas of memory where other types of processors using different length words may have stored data.

We apply the teachings of this invention to our computer systems design to support A-series architecture which has a 56 bit word, which is used in systems with Intel architected systems using a 32 and 64 bit word as well as OS2200 computer system processors which use a 40 bit word.

Many other problems can also be solved by having a mechanism that allows a processor to use a cache for words of more than one length in a computer system having more than one type of processor using words of different lengths.

SUMMARY OF THE INVENTION

In accordance with an embodiment of the present invention, an IC is provided which has a memory subsystem including at least one data cache with an extended data queue. The input lines to the data cache for words are of a size able to handle the words of the largest architecture. Generally they are clocked in and out, at least a word at a time. The data cache with the extended queue thus has two stores. It uses these stores to store a first portion of a word in the main cache, and the extended data queue stores a second portion of the word. The IC can also have a processor and an interface constructed and arranged to communicate with a part of the computer system external system to the IC. The data cache with the main cache area and extended data queue are connected between the processor and the interface.

In accordance with further aspects of the embodiment, a bus interface to the cache memory subsystem has a send data queue and a read data queue. The send data queue communicates with the external to the chip parts of the computer system to send data and the read data queue communicates with the external to the chip parts of the computer system to accept data. In addition, the extended data queue may store a corresponding address location for the extended data. What is meant by this is that the extended queue holds data (bits 63-56 from each word in the preferred embodiment) and corresponding cache line memory addresses correspond to the location of the 8 bits in the extended queue. Thus for each of the cache lines in the cache memory, we split off the last 8 bits of each into the extended data queue, serially stacking them into the words, so that their location identifies which cache line they were part of. The extended data queue is eight locations deep, and each of these eight locations contains a cache line address and (16×8) bits of extended data (because there are 16 words in each cache line and each word has 8 bits of extended data).

In accordance with another embodiment of the present invention, a method for transferring data from a first chip to a second chip is provided as well. The first chip uses a first size and the second chip uses a second size. The method comprises the steps of accepting a first sized data word (the larger of the two sizes of data words in our preferred embodiments) and dividing the first size data word into a first portion and a second portion, the second portion size equal to the second sized data word. The first portion is stored in a first location and the second portion in a second location.

Thus, this method allows for transferring data from a first area of a computer system to a second area, which is in a memory subsystem of the computer system, even though the first area uses a first size word and the second area uses a second size word. To accomplish this we accept a data word for storage into two portion areas of the memory subsystem; the first portion being directed into a first data cache area and the second portion being directed into a second area, an extended memory area. We assume for most embodiments that the second portion is either the same as the difference in size between said first size word and said second size word, give or take ECC bits or other peculiarities of the systems under consideration. We then determine whether the second portion is valid. In other words, if it has any data besides zeros in it, it is valid. The quickest way to do this is by analyzing said second portion with an OR operation, but other operations could be used. Finally, we discarding said second portion if it is determined to be invalid. If the second portion is determined to be valid, we send it and its companion word (the first portion) back to memory or wherever it came from so as to not corrupt the data.

In accordance with further aspects of the invention, the method further comprises determining whether the second portion is valid and if so, combining the first portion with the second portion. In addition, the method may further comprise returning the first size data word to its source of origin (L3 cache or Main Memory, or I/O etc.). Further, the first portion may be combined with a predetermined number of zero bits if the second portion is not valid.

In accordance with an alternative embodiment of the present invention, a system is provided having a first memory handling component and a second memory handling component, the first memory handling component (for example a first Level 2 or other cache or main memory or I/O, etc.) using a first sized data word and the second memory handling component (or second Level 2 or other cache) using a second sized data word, the first sized data word being greater than the second sized data word. The second memory handling component comprises a data cache and an extended data queue, and in our preferred embodiment computer systems is in a second level cache, also called an L2 cache. The data cache stores a first portion of the first size data word and the extended data queue stores a second portion of the first size data word, the first portion size equal to the second size. Thus, the larger word coming from the main memory is accepted into the preferred embodiment L2 cache in two parts, with the part longer than the second sized word which the L2 cache usually works with going into the data cache as the first portion and the excess going into the extended data queue as a second portion.

In accordance with further aspects of the alternative embodiment, the second memory handling component further comprises a processor and an interface constructed and arranged to communicate with an external system within the computer system. The data cache and the extended data queue are operably connected between the processor and the interface to the "external system". In addition, the bus interface may further comprise a send data queue and a read data queue wherein the send data queue communicates with the external system to send data and the read data queue communicates with the external system to accept data. Further, the extended data queue may store an address corresponding to the data word.

DETAILED DESCRIPTION OF THE PREFERRED EMBODIMENT

Figure 6:
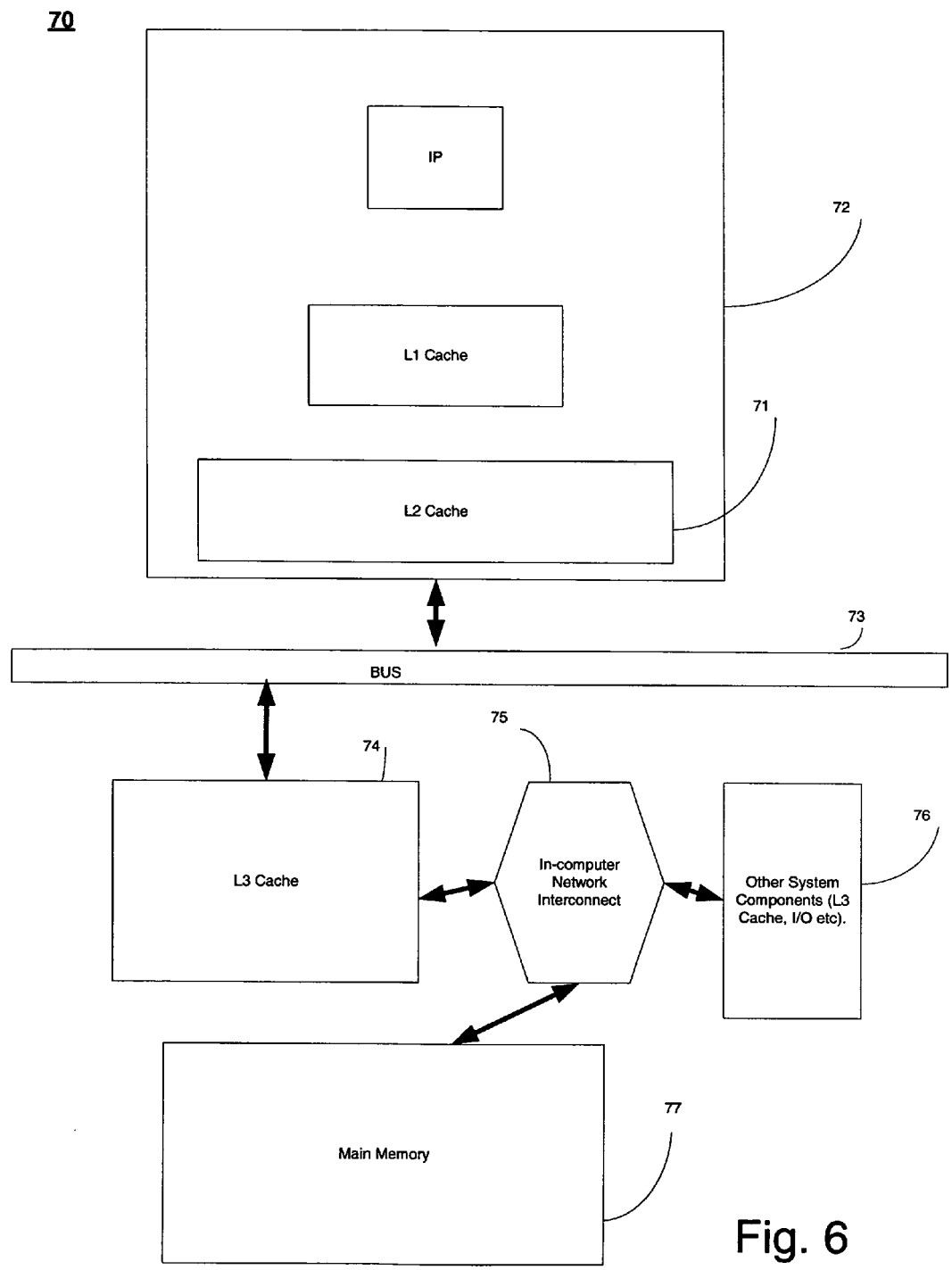
FIG. 6 is a block diagram of a computer system's components which provide a context in which the invention can be used.

Refer first to FIG. 6, a heuristic block diagram of a computer system 70 in which this invention can function. Note that it has a main memory 77, connected to the rest of the computer system components through an in-computer network interconnect 75. The in-computer network interconnect 75 could be a set of busses or point to point connections, depending on the design of the computer system, but its detail is not relevant to this invention. The relevant feature is that it transports words of two different sizes over to components of the system which use them natively, one set of components using words of a first size and other components using components of a second size, but the pathways being of the larger, in this case, first size, such that the components which natively use the second size word must accommodate the larger words.

The system components of general interest to this invention are described with block 76, as also connected to the system interconnect 75. The components 76 can natively use the larger sized word, or the smaller sized word, but they will preferably use the larger sized word for communications through the interconnect 75. Thus if processors or memory components using 64 bit words are (in) block 76 and communicate through interconnect 75, the word size reaching the interconnect is 64 bits. If the native processor word size for processor IP in block 72 is 56 bits, this invention does not address how to convert the word meanings between the two sizes. It merely handles the difficulties that arise through misplaced directives to word stores or instructions of the wrong size by the 56 bit processor so that the data areas used by the larger processor are not corrupted. The inventive implementation we describe uses features that reside in the L2 Cache 71 of the Instruction Processor block 72, which communicates in our preferred embodiments through a third level cache L3 Cache 74, via a bus 73. This L3 Cache in turn handles communications for all components on bus 73 (such as block 72), so that they can communicate through the system interconnect component to the main memory and other system components which has a main memory, a long term memory, a set of caches for two different kinds of (word sized) processors and interconnects between the components. Thus, the bus 73 must communicate using the larger sized words.

Generally, Cache is designed to hold the contents of recently-accessed memory locations in case they are needed again. In this way, caches improve performance by bringing data closer to the processor, both spatially and temporally. Spatial locality refers to physical position, adjacent words are more likely to be fetched than non-adjacent words. Temporal locality refers to the time at which a word is fetched, a recently fetched word is more likely to be needed than one fetched earlier.

Cache is comprised of two main components, usually not physically connected, that represent how the cache works logically. The data store is the actual cached information. When reference is made to "storing something in the cache" or "retrieving something from the cache", the data store is where the actual data goes to, or comes from. Cache size refers to the size of the data store, a 512 KB cache, is a 512 KB data store.

The second component is the tag RAM which contains the location, or addresses, of the cached information. When the processor requests data it does so with the memory address of the required information. That address is compared with the entries in the tag RAM. If the address is in the tag RAM, it indicates the required information is already in the cache. An occurrence of the requested information already being in the cache is known as a hit.

Cache is normally organized as a set of cache lines, each containing at least one word. Each data transfer to and from the cache occurs in specific increments equal to the size of the cache line. The data store can be thought of logically as structured like a table, with columns and rows. One row for each line and one column for each basic unit in the line. For example, a line may be 32 bytes (1 byte equals 8 bits), in which case there would be 32 columns. A line may also be 16 words, where each word is 64-bits. In that case, there would be 16 columns.

Multiple terms may exist in the art that refer to the same thing. For example, groups of employees working on a project internally may refer to a cache line as a cache block. To avoid confusion, this disclosure will use the term cache line throughout.

To function effectively, the cache is given a specific relationship to the memory addresses it serves, known as mapping. How the cache is mapped to the system memory is an important factor in determining the effectiveness of the cache. For example, consider a system with 512 KB of cache with a 32 byte cache line, and 64 MB of main memory. Generally, there are three different ways to map the cache to the main memory.

The simplest way to allocate the cache to the system memory is to determine how many cache lines there are (cache size, 512 KB divided by cache line size, 32 bytes, equals 16K, or 16,384) and then divide the system memory into the same number of sections, with each section allocated to one cache line. This is known as Direct Mapping. So, the 64 MB of main memory addresses is divided into 16K sections, one section for each line of cache. In each section, there are 4K memory addresses that share one line of cache (64 M divided by 16 K).

Instead of hard-allocating cache lines to particular memory locations, it is possible to design the cache so that any line can store the contents of any memory location. This is known as Fully Associative Mapping.

The third method of cache mapping is known as N-Way Set Associative Cache. "N" here is a number, typically 2, 4, 8 etc. This is a compromise between the direct mapped and fully associative designs. The cache is broken into sets, each containing N cache lines, for example, 4. Next, each memory address is assigned a set, and can be cached in any one of those 4 locations in its assigned set. In other words, within each set the cache is associative, hence the name.

Conceptually, the direct mapped and fully associative caches are just special cases of the N-way set associative cache. Where "N" is 1, a "1-way" set associative cache results, so there is only one line per set, which is the same as a direct mapped cache because each memory address is pointing to only one possible cache location. On the other hand, when "N" is large enough, so that there is only one set containing all of the cache lines, every memory location would point to that one set. Any memory address can be in any line, as in the fully associative cache mapping. For example, if "N" is equal to the number of lines in the cache, (16K in the example) there is only one set.

Since each cache line in the cache data store is shared by a large number of memory addresses, a system should keep track of which memory address is using each cache line at a given time. This is accomplished using the tag RAM.

To illustrate the function of tag RAM, assume a system with 64 MB of main memory, a 512 KB cache, and 32-byte cache lines. There are 16K cache lines, and therefore 4K different memory locations that share each line. Each line contains 32 bytes, so 32 different bytes can be placed in each line without interfering with another line. In practice, there are 128 (4,096 divided by 32) different 32-byte lines of memory that share a cache spot. It should be noted that the size of the memory and cache configuration varies from system to system. This example assumes arbitrary numbers and is only meant to illustrate the basic principles of the tag RAM.

To address 64 MB of memory, 26 address bits are needed, ($2^{26}$ is 64 M). Memory addresses are a string of 1's and 0's that indicate the location of data in specific memory. The number of available locations depends on the number of address bits used. For example, 4 address bits yields $2^4=16$ memory locations because there are 16 distinct combinations of 1's and 0's, and therefore, 16 addresses. For reference, each address bit is numbered, starting with 0, going from right to left. So a 16-bit address has bits [15 . . . 0] (15 to 0). These bits may be split up into an upper half, [15 . . . 8], and a lower half [7 . . . 0].

In a system with 64 MB of memory, 26 address bits are needed to address each location. 512 KB of cache, however, only requires 19 bits, [18 . . . 0], seven less than the requirements of the system memory. Memory address requests to the 512K of cache use all 26 bits, but the extra 7 bits indicate which of the 128 different addresses are actually using a given cache line at the moment, the function of the tag RAM. There will be as many entries in the tag RAM as there are in the data store, so that each location can be tracked.

The above addressing example, again, is a simplified one meant to illustrate the basic principles of addressing memory. It should be noted that addressing may be done by bytes or words. Addressing schemes vary from system to system and whether a system uses bytes or words to address memory, it will still be within the scope of the invention discussed herein.

When the processor needs data, it issues a request to the cache controller with a memory address representing the location of the data. The cache request is divided into three sections by the cache controller as it looks for hits. To illustrate the cache request and how it is used, consider a direct-mapped set-associative second-level (L2) cache of size $2^N$. The value is addressed with a set address of N-4 bits. Assuming N=19, the tag is comprised of bits [35 . . . 19], the set is bits [18 . . . 4], and the word is bits [3 . . . 0]. Thus, the cache request looks like the following:

| TAG | SET | WORD |
|---|---|---|
| Bit  35 | 19  18 | 4  3   0 |

Bits [3 . . . 0] are the lowest-order 4 bits representing the 16 different cache words in a specific line ($2^4$=16). The cache line in this example is 16 words, all of which are moved around together. Using 4 address bits yields 16 distinct addresses ($2^4$=16). The first four address bits, [3 . . . 0], are ignored by the cache controller because are used by the processor to determine which of the 16 words received from the cache to use.

SET, bits [18 . . . 4] represent the cache line that the TAG maps to, i.e., where TAG is located. SET (the cache line address) is used for looking up both the tag address in the tag RAM, and later the actual data in the data store if there is a hit.

TAG, bits [35 . . . 19] represent the tag address, which indicates the L2 cache extended data location of the data required by the processor. The TAG combined with congruence class and word points into the main memory location for the data.

The system memory address of the data needed by the processor is the combination of the TAG, SET, and WORD. The "data" held in the tag ram is actually the upper portion of the memory address called the tag. To check for a cache hit, the contents of the address location that SET points to is compared to TAG. If they match, there is a hit.

Thus, in this example, each entry in the tag RAM corresponds to 16 data words, and the tag RAM is $2^{N-4}$ deep. These data words are stored in a separate data cache which is $2^N$ deep.

How cache deals with caching writes is its "write policy." Write-Back Cache, also referred to as "copy back" cache, is full write caching of the system memory. When a write is made to system memory at a currently cached location, the new data is only written to the cache and not to the system memory. Later, if another memory location needs to use the cache line where this data is stored, it is saved ("written back") to the system memory before the line can be used by the new address. Write-Through Cache occurs when both the cache and the underlying memory location are updated every time the processor writes to a cached memory location.

In effect, the cache according to an embodiment of the present invention is a "write-back" cache, as opposed to a "write-through" cache. When the processor modifies data in a write-back cache, the modification is made to the data held in the cache and not reflected out to the rest of the system (via the bus and/or other pathway) until the cache line is either replaced or returned. A "return" occurs when another agent (memory controller or another processor) on the bus requests the cache line. A "replace" occurs when the location in the cache is needed to hold a different cache line. In a write-through cache, any change to the data in the cache is immediately reported to the rest of the system. To do so, the processor initiates a write operation on the bus.

Computer systems may include more than one processor. A bus, crossbar, or other system interconnect pathway connects system components for communication, including memory to processor (read and write) and processor to processor communications. Each component in the system has an interface, such as a bus interface for communicating with the bus or other system interconnect pathway. If chips with different architectures are used in the same system, a discrepancy may arise between their word sizes. For example, if a 56-bit processor were used in conjunction with a 64-bit processor and they share the system memory, there can be some conflicts.

Each chip or system component in a system has specific, delegated tasks and duties, including data analysis that may modify certain data. In such cases, the chip takes ownership of the data, meaning it has authority to modify it. Depending on the system, only the chip or system component that has ownership of data at a given time may modify it.

When the cache of the 56-bit processor accesses data from system or main memory, it will take ownership of the data at times and when it does, the data is stored in the internal cache which is designed on a 56-bit architecture, thereby losing the last 8-bits that may contain valid and valuable information for other system components that operate on 64-bit words, namely those with a "greater than" 56-bit architecture. After the 56-bit chip is done with the owned data, it is replaced from the cache, however, only the lower 56-bits are replaced, the upper 8-bits are set to zero. There are instances where a chip will only read data without taking ownership. In this case, the chip does not modify the data so loss of extended data is not a concern because it is not returned. Also, in most instances, the 56 bit processor which has authority to modify information in a word only modifies information in words dedicated to itself and its kind of architecture. However, where it addresses memory in a location that is shared or if it gets the address of memory at locations where the 64 bit architecture processors may use the same data, there is an obvious problem, because any time the 56 bit processor takes control, it writes back only the first 56 bits, and the remaining 8 bits are lost.

Figure 1:
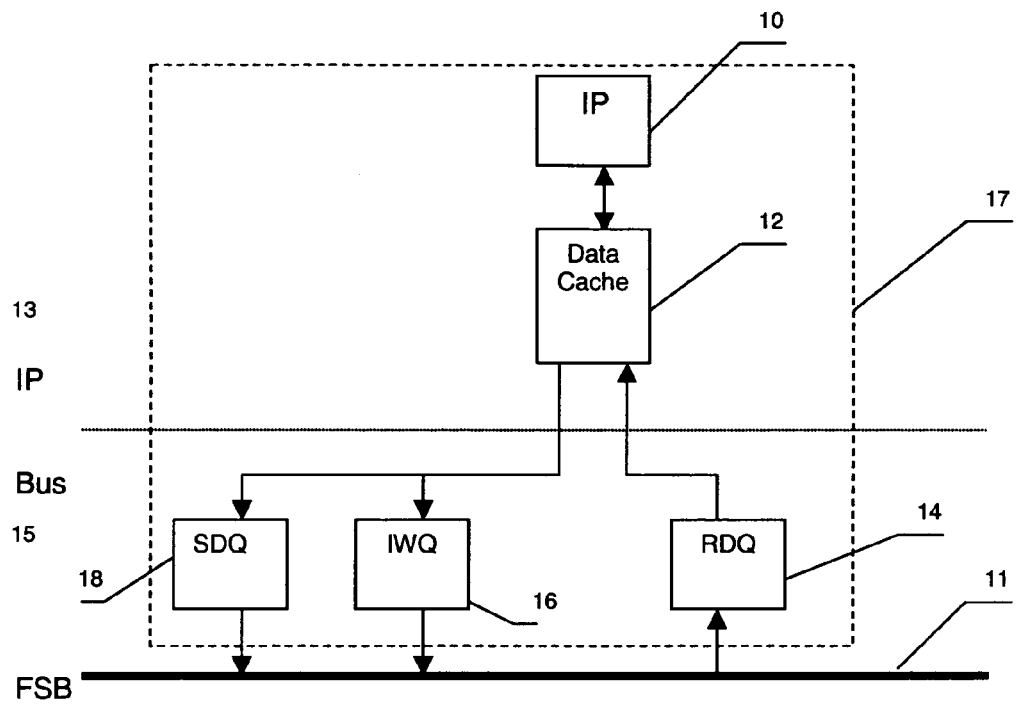
FIG. 1 is a diagram of the data flow between a chip and its system bus in a prior art system.

The flow of data between bus 11 and chip 17 in a prior art system is shown in FIG. 1. The integrated processor (IP) 10 in this example is a 56-bit processor in a 64-bit system with 8 error correction (ECC) bits. The IP 10 and data cache 12 lie within the IP clock domain 13, which is asynchronous to the Front-Side Bus (FSB) clock domain 15. Outbound (write) data is handled by the Store Data Queue (SDQ) 18 and Implicit Writeback Queue (IWQ) 16. Inbound (read) data is handled by the Read Data Queue (RDQ) 14 which is large enough to handle the full 72-bit data word (64 data bits plus 8 ECC bits). These queues are part of the synchronizing logic that allows data flow between the two clock domains 13 and 15.

The RDQ 14 is 4 words wide and 32 locations deep, so it can hold a total of 8 16-word cache lines. The upper 8 bits of each word are lost when the 72-bit data word is sent to the data cache 12, at the output of RDQ 14.

Figure 2:
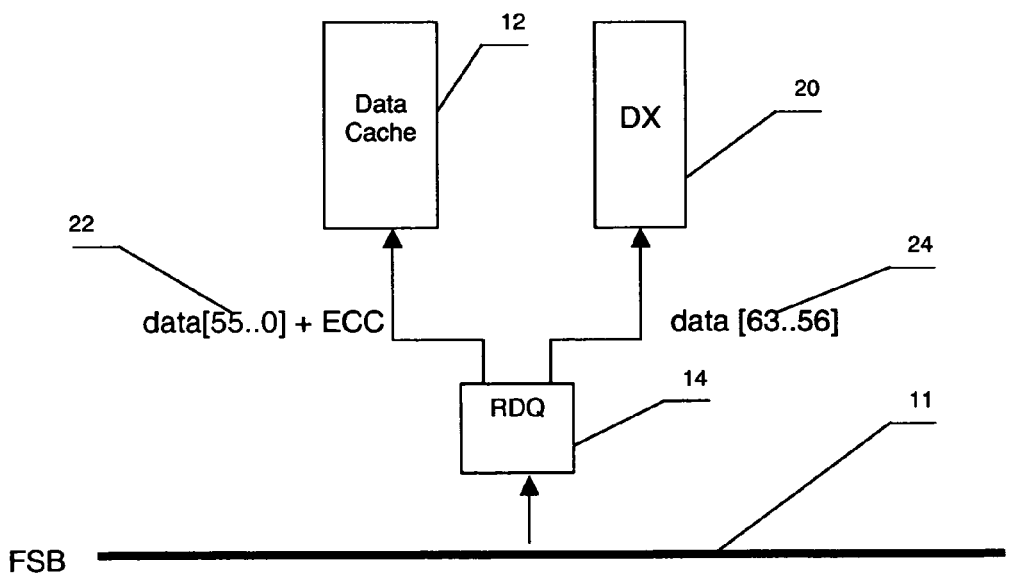
FIG. 2 depicts the data flow of incoming data according to an embodiment of the present invention.

FIG. 2 shows an embodiment of the present invention having a data extension (DX) queue 20 is added alongside the data cache 12. The DX queue 20 holds the extended data, which, using the example of the 56 and 64 bit architectures above, will be the upper 8 bits [63 . . . 56] of each word in a cache line as data comes into the cache. A cache line in DX 20 with any non-zero data found in the upper 8-bits of any word is scheduled for immediate replacement to be rewritten back to the system. In this way, when a word comes into the 56-bit cache with data in bits [63 . . . 56] the whole word is sent back to the system memory, thereby saving the data stored in the upper bits instead of destroying them.

The upper eight bits of each word in a specific cache line is entered into DX 20 with its corresponding address. Preferably, DX 20 is written on all memory reads, for each word, to ensure the integrity of the upper eight bits of each word. If an OR operation of the contents of DX results in a value of 1 (if any bit equals 1), then the upper bits of each word are combined with their corresponding lower bits and sent back to memory.

The number of bits in chip architectures and extended data used herein are merely examples and may be changed to fit the needs of any system with chips operating on different architectures. For example, these principles would still apply for a 64-bit processor and cache chip in a 72-bit system, or a 32-bit cache in a 38-bit system, et cetera. In any case, the extended data is the extra bits that are not processed by the smaller architecture, as in the leftover 6 bits for the 32-bit chip in a 38-bit system. That extended data is held in a queue to be replaced in the system to preserve the information contained therein.

Consider a 64-bit system with a 16-word cache line operating on a data bus 2 words wide. Further assume data is transmitted at 2× the bus clock rate, so 4 data words are transferred on each bus clock. Thus, it takes a minimum of 4 bus clocks (wait states are permitted) to transfer a full 16-word cache line. Each word in the cache line is 64-bits long. A 56-bit processor resides in the system. As explained earlier, whenever the cache on the 56-bit processor accesses cache data from the system memory, it will only use the first 56-bits, thereby losing the upper 8-bits when replacing the data. Since there are 16 words in a cache line, there are 16 sets of 8-bit extended data for each cache line. With this configuration, four words would be read out of RDQ on each clock, so it would take at least 4 clocks for the data cache and DX to be written.

Figure 3:
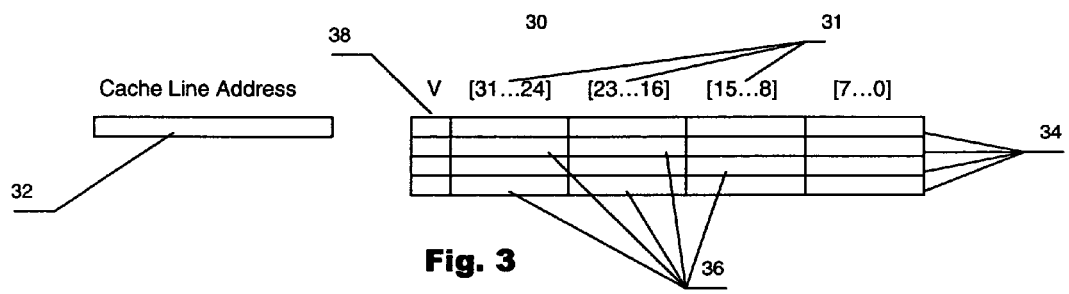
FIG. 3 shows a cache line address and its corresponding data according to an embodiment of the present invention.

FIG. 3 shows an exemplary cache line address 32 in DX with its corresponding data generally indicated by reference numeral 30. Because the data 30 is output from RDQ at a rate of 4 words per clock, and each cache line has 16 data words, DX is organized in four 32-bit pieces 34. Each individual cell 36 represents the upper-8 bits of each word in the cache line, so each 32-bit piece 34 (row) contains the upper 8 bits (63 . . . 56) of 4 data words. Bit numbers 31 show the position of each 8-bit set. [7 . . . 0] is the first 8 bits, [15 . . . 8] the next 8 bits, and so on for each row.

Each row 34 in DX has a corresponding valid bit 38. If any of the bits in the row 34 contain extended data, the valid bit 38 for that row is set (equals 1). At the end of the 4-clock transfer, if any of the 4 valid bits 38 is set, the cache line data is immediately replaced at the line address 32. Preferably, the address held in DX is dropped into a Replace Queue, which is a queue for holding addresses scheduled for replacement. Using a Replace Queue makes some of the timing issues with sending this data back easy to resolve, but the operation of interest is really sending the data back intact to whence it came, so this data could simply go back onto the bus in any manner desirable to the designer.

Figure 4:
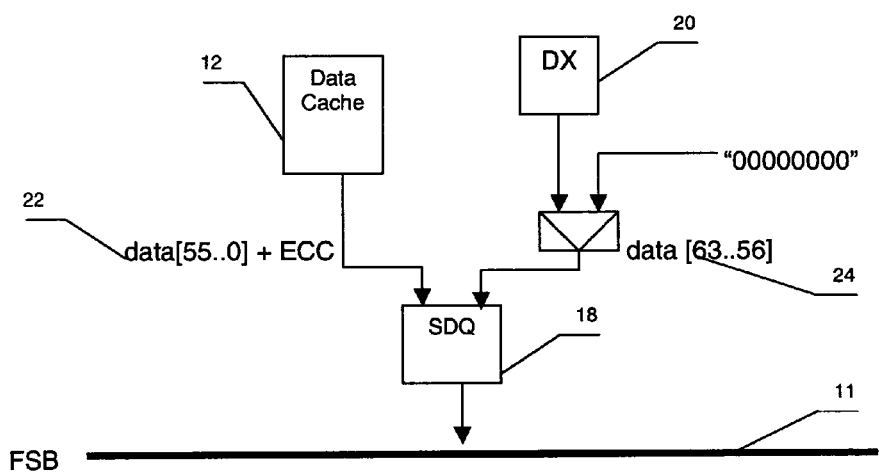
FIG. 4 is a diagram of the data flow for outgoing data according to an embodiment of the present invention.

FIG. 4 shows the data flow for replacing the cache line data. When a cache line is replaced, the lower 56 bits 22 of each data word come out of the data cache 12, and the upper 8 bits 24 come out of either DX 20 or are simply set to zero depending on whether there is any data in the upper 8-bits 24 of the cache line being replaced.

Figure 5:
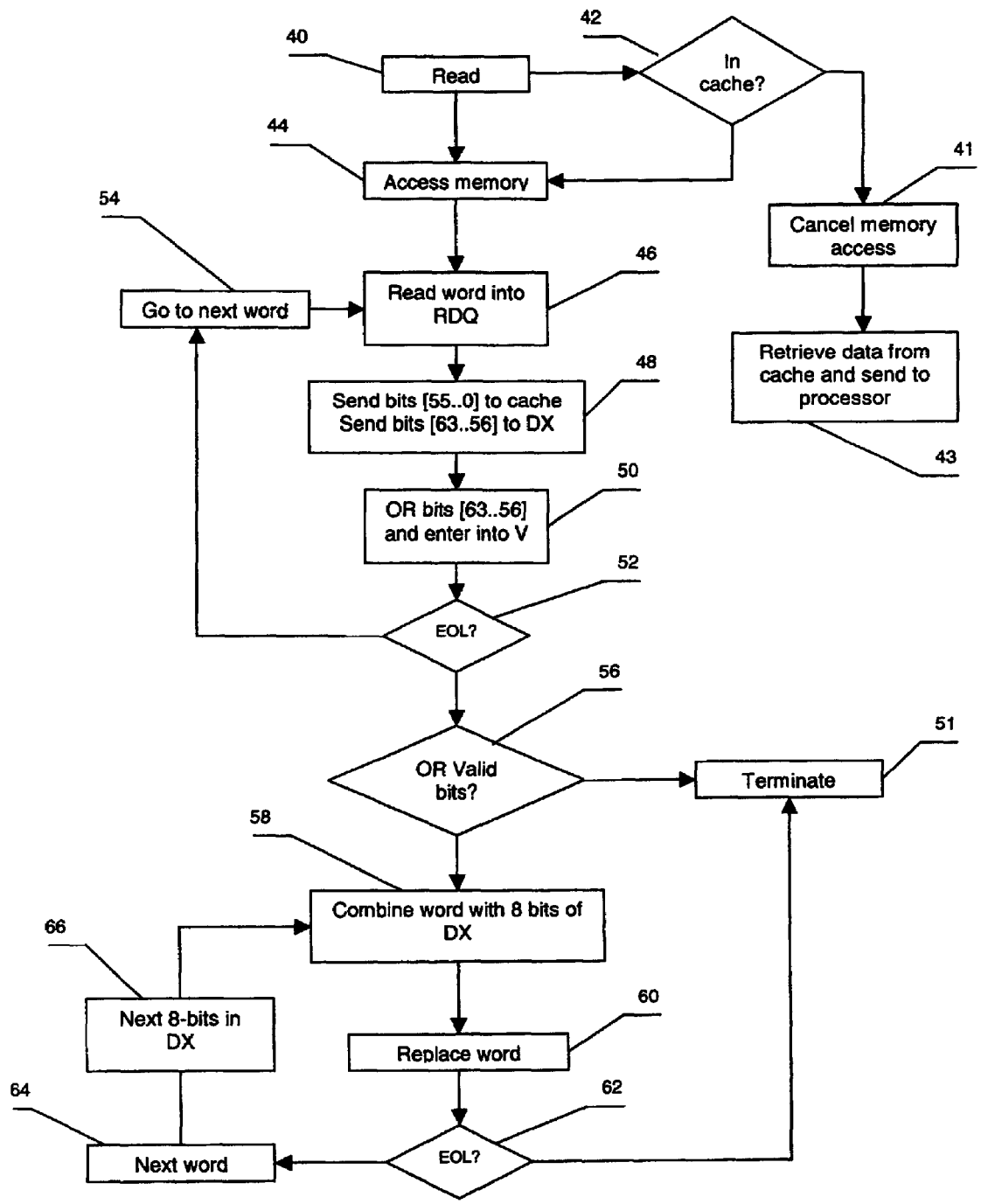
FIG. 5 is a flowchart for the method of dealing with extended data according to an embodiment of the present invention.

FIG. 5 is a flowchart for the process of accessing, caching, and replacing data according to an embodiment of the present invention. Write operations originating from the processor should not produce extended data. A 56-bit processor would only produce 56-bits of data so naturally, any data originating at the 56-bit processor and put on the data bus in a 64-bit system would have the last 8-bits as zero. Therefore, only read operations where 64-bit data is taken from system memory and replaced are a real concern.

The processor issues a read command (step 40) to obtain certain, required data. The cache controller checks the cache data store to determine if the required data is already in the cache (step 42). In the event of a miss (step 42), the processor continues with the memory access (step 44).

The process of checking for a cache hit (step 42) may proceed according to standard practice. In short, assuming the direct-mapped set-associative L2 cache of size $2^N$ discussed previously, where N was equal to 19, the processor sends a cache request to the cache controller with address bits [35 . . . 0] where bits [3 . . . 0] indicate the word in the cache line, bits [18 . . . 4] indicate the location of the cache line and bits [35 . . . 19] is the tag. Lines [3 . . . 0] are ignored because they differentiate between the sixteen different words in the cache line which the cache controller is not concerned with because it will return the whole line, all sixteen words, and let the processor decide which one to use.

As previously discussed, the cache controller reads the tag RAM at the address indicated by bits [18 . . . 4] (SET) and compares the contents from the tag RAM at that location to the contents of TAG, bits [35 . . . 19] received from the processor. If they are identical, the entry in the cache at that line address is the requested data and there is a hit. If the tag RAM doesn't match, there is a miss.

If there is a cache hit (step 42), the data is retrieved from the cache and sent to the processor (step 43). Because the data is coming from the cache of the processor, and not external system cache, that data should only contain 56-bits. In addition, because DX is preferably written to on every memory read, any contents in the processor's cache should already have its original upper 8-bits replaced. In other words, because each time data comes into the cache, and the upper 8-bits of every word are replaced when valid data is present, it can be assumed that the upper 8-bits of cached data, if any, have already been replaced to system memory. Therefore, in the event of a hit (step 56), the process terminates (step 51).

If there is a miss (step 42), the access to memory continues (step 44) and the data from the requested location is read into RDQ (step 46). From RDQ, the data is sent into the cache with bits [55 . . . 0] going to the data store and bits [63 . . . 56] going to the extended data queue (step 48). The bits in the extended data are checked for valid data by analyzing those bits with an OR operation and the result is entered into the valid bit field of DX(step 50). If the previous word entered into the cache is not the end of the cache line (step 52), the memory controller goes to the next word (step 54) and again reads it into RDQ (step 46), sending the upper 56-bit word to the cache and the extended data to DX (step 48), analyzes the extended data (step 50) and again checks for the end of the line (step 52). This loop (steps 46 to 54) is executed repeatedly until an entire cache line is entered into the cache.

When the controller reaches the EOL (step 52), the contents of DX are examined. At this point, DX holds the upper 8-bits of 16 words in a cache line with a corresponding valid bit for four groups of extended data sets (as shown earlier in FIG. 3). An OR operation is executed on the four valid bits in DX (step 56). If the operation is true then the cache line contents in DX are replaced to the system memory. Each word is combined with their corresponding upper 8-bits by reading each individual word and combining it with the corresponding 8-bit set in DX (step 58). The full 64-bit word is then replaced (step 60), and a check is performed to determine whether that word is the last in the cache line (step 62). If not, the next word in the cache line is found (step 64) with its corresponding 8-bits (step 66). They are a combined to form the original data word (step 58) and replaced in the system memory (step 60). This loop (steps 58 to 66) repeats until the end of the cache line is reached (step 62), at which point the process terminates (step 51).

In effect, the cache behaves like a write-through cache for lines with extended data. When data is received, the system detects non-zero data in bits [63 . . . 56], and immediately schedules replacement for the entire cache line. As previously explained, when the processor modifies data in a write-back cache, the modification is made only to the data held in the cache and is not reflected out to the rest of the system (via the bus) until the cache line is either replaced or returned. A "return" occurs when another agent (memory controller or another processor) on the bus requests the cache line. A "replace" occurs when the location in the cache is needed to hold a different cache line. In a write-through cache, any change to the data in the cache is immediately reported to the rest of the system. Therefore, a replace operation is usually done when the location in the cache is needed to hold a different cache line.

In some embodiments it may be useful to return an error signal to an error signal handler to indicate that something has gone wrong when it is determined that a wrong sized word was received in the smaller word-sized part of the computer. Such an error signal can easily triggered by the finding of valid data in the extended data queue. The error signal could go out together with or as triggered by the return of the recombined word to its origin. Whether or not an error signal is generated, use of this invention will prevent corruption of data that could otherwise be caused by reads or writes to areas of memory or storage that are not appropriate for the smaller sized word parts of the system to address.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A cache memory for use in a computer system having more than one word length wherein a first of said more than one word lengths is a longer length word than a second of said more than one word lengths which is a shorter length word, said cache memory comprising:
    a data cache;
    an extended data queue; and
    logic,
    wherein the data cache stores a first portion of a word directed to or through said cache memory, and the extended data queue stores a second portion of the word directed to or through said cache memory, the second portion of the word being of a length equal to or less than a difference between said longer and shorter length words, and wherein the logic determines whether the second portion of the word is valid by analyzing the second portion of the word from the extended queue with an OR operation, and discards the second portion of the word if it is determined to be invalid.

2. A computer system having the cache memory of claim 1, said computer system further comprising:
    a processor;
    a bus interface constructed and arranged to communicate with components within said computer system that are external to a circuit area having said processor and said cache memory;
    wherein the data cache and extended data queue are operably connected between the processor and the bus interface.

3. The computer system of claim 2 wherein the bus interface further comprises:
    a send data queue; and,
    a read data queue;
    wherein the send data queue communicates with said components external to said circuit area to send data and the read data queue communicates with said components external to said circuit area to accept data.

4. The cache memory of claim 1 wherein the extended data queue stores a cache line address corresponding to each cache line of extended data.

5. The cache memory of claim 4 wherein said cache lines are sixteen words in length.

6. The cache memory of claim 1 wherein the first portion is 56 bits of said word of longer length.

7. The cache memory of claim 1 wherein the second portion is 8 bits of said word of longer length.

8. A method for transferring data from a first area of a computer system to a second area of a memory subsystem of a computer system, the first area using a first size word and the second area using a second size word, the method comprising the steps of:
    accepting a data word for storage into two portion areas of said memory subsystem; the first portion being directed into a first data cache area and the second portion being directed into a second area wherein the second portion is of a size the same as the difference in size between said first size word and said second size word;
    determining whether the second portion is valid by analyzing said second portion with an OR operation; and
    discarding said second portion if it is determined to be invalid.

9. The method of claim 8 further comprising the step of storing a first size data word address corresponding to the first size data word in a Replace Queue if the second portion is valid.

10. The method of claim 9 further comprising the step of combining the first portion with the second portion if the second portion is valid.

11. The method of claim 10 further comprising the step of returning the recombined data word to its source of origin.

12. The method of claim 10 further comprising sending an error code to an error code monitoring system indicating that said second portion was found valid.

13. The method of claim 11 further comprising combining the first portion with a predetermined number of zero bits if the second portion is not valid before returning said word to said components external to said circuit area.

14. The method of claim 13 further comprising the step of replacing the recombined first size data word with predetermined number of zero bits in its original location.

* * * * *